A. E. Young,
Caster Holder.
Nº 49,840. Patented Sep. 5 1865.

Witnesses:

Inventor
Alonzo E. Young.
by his attorney
R. H. Eddy

UNITED STATES PATENT OFFICE.

ALONZO E. YOUNG, OF DORCHESTER, ASSIGNOR TO HIMSELF AND JOHN W. HAINES, OF SOMERVILLE, MASSACHUSETTS.

CASTER-BOTTLE HOLDER.

Specification forming part of Letters Patent No. 49,840, dated September 5, 1865.

*To all whom it may concern:*

Be it known that I, ALONZO E. YOUNG, of Dorchester, in the county of Norfolk and State of Massachusetts, have invented an Improved Manufacture of Glass Caster or Caster-Bottle Holder; and I do hereby declare the same to be fully described in the following specification and represented in the accompanying drawings, of which—

Figure 2:
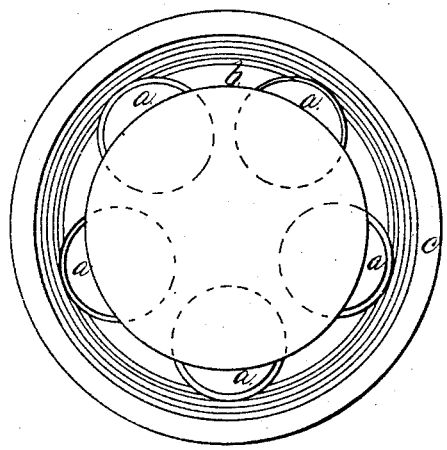
Figure 3:
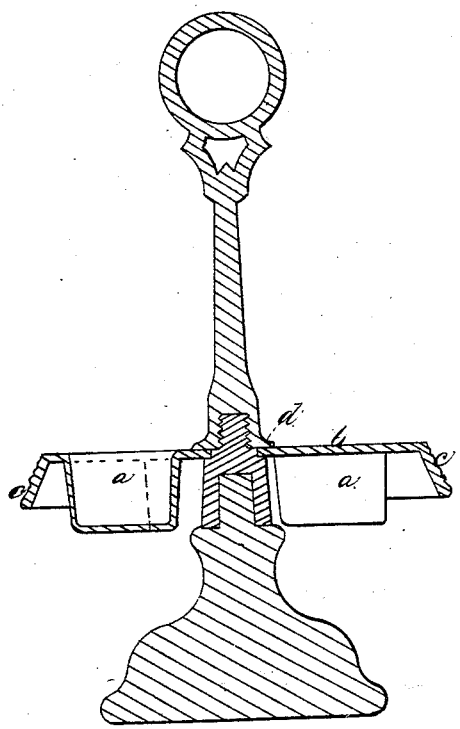
Figure 1:
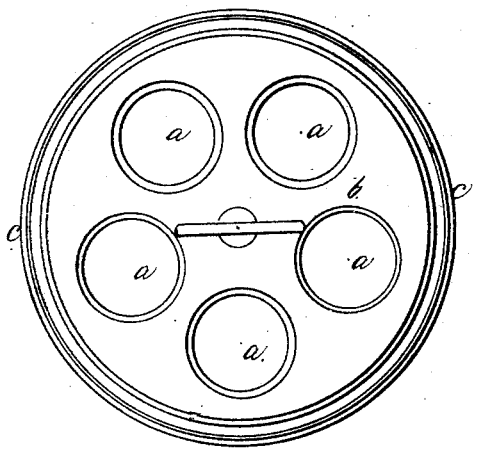

Figure 1 is a top view, Fig. 2 a bottom view, and Fig. 3 a transverse section, of one of my improved bottle-holders.

When used it constitutes that part of a common table-caster which serves to support the bottles thereof. It is made of glass and in one piece, and formed by pressure in a mold.

In the said drawings, *a a a* denote a series of cups, connected with a circular plate, *b*, and arranged at equal distances apart about its center. Each of such cups opens through the plate and extends below it in a manner as exhibited in Figs. 2 and 3. A concave flange or rim, *c*, projects from the circumference of the plate downward, and serves not only to give strength to the plate, but to hide from observation, under ordinary circumstances, such parts of the cups as project below the plate. Through the center of the connection-plate there is a hole, *d*, for receiving the journal on which the bottle-holder is to revolve when applied to its stand.

I do not herein claim a glass caster-bottle holder made with cups and in one piece of glass and with a flange around to extend down from its periphery; but What I do claim as my invention is—

The improved manufacture of glass caster-bottle holder, made not only with a disk or plate and a flange to extend around and project below such disk, but with cups to open out of and extend below the disk in manner as specified, the flange under such circumstances serving to hide the cups more or less from view when the article may be in use with its stand on a table.

ALONZO E. YOUNG.

Witnesses:
R. H. EDDY,
F. P. HALE, Jr.